United States Patent [19]
Ferguson

[11] Patent Number: 5,649,186
[45] Date of Patent: Jul. 15, 1997

[54] SYSTEM AND METHOD FOR A COMPUTER-BASED DYNAMIC INFORMATION CLIPPING SERVICE

[75] Inventor: Gregory J. Ferguson, Hunt Valley, Md.

[73] Assignee: Silicon Graphics Incorporated, Mountain View, Calif.

[21] Appl. No.: 511,832

[22] Filed: Aug. 7, 1995

[51] Int. Cl.[6] .................................................. G06F 17/30
[52] U.S. Cl. ......................... 395/610; 395/601; 395/603
[58] Field of Search ................................... 395/601, 602, 395/603, 604, 605, 606, 607, 608, 609, 610, 611, 800, 712; 370/60; 364/188, 191, 192

[56] References Cited

U.S. PATENT DOCUMENTS

| 5,019,961 | 5/1991 | Addesso et al. | 364/192 |
|---|---|---|---|
| 5,408,659 | 4/1995 | Cavendish et al. | 395/650 |
| 5,452,468 | 9/1995 | Peterson | 395/800 |
| 5,493,568 | 2/1996 | Sampat et al. | 370/60 |

*Primary Examiner*—Thomas G. Black
*Assistant Examiner*—Ruay Lian Ho
*Attorney, Agent, or Firm*—Sterne, Kessler, Goldstein & Fox, P.L.L.C.

[57] ABSTRACT

A system and computer-based method providing a dynamic information clipping service. An end-user creates a template of topics of interest via a graphical user interface and the template is transmitted to a central site for processing. At the central site, information relating to a particular base of knowledge is collected, parsed and indexed. The parsed and indexed information is stored in an information repository. The template is processed by parsing and collecting command-strings relating to the topics of interest found within the parsed template. The information repository is searched using the collected command-strings to generate query results, which are then sorted. A Hypertext Mark-up Language (HTML) page is created using the sorted query results. The page is then made available to the end-user for viewing, wherein the page represents a custom network-based newspaper.

14 Claims, 9 Drawing Sheets

Information on "News Summaries" for the dates 19950621 to 19950622

*2 Documents Found*
- 1. Newsbyte: Newsbytes Daily Summary 06/22/95
- 2. Newsbyte: Newsbytes Daily Summary 06/21/95

Business & Finance Section
......................................................................

Information on "Deals, Partnerships & Alliances" for the dates 19950621 to 19950622

*4 Documents Found*
- 1. Newsbyte: Madge Networks To Acquire Israel's LANnet 06/21/95
- 2. Newsbyte: ****PSI Buys UK Internet Provider 06/21/95
- 3. Newsbyte: Microsoft & Timeline Join Forces On New Product 06/22/95
- 4. Multimedia Wire: Creative Multimedia to be Acquired, Expands Business Model Stock Quotes

Computers & Technology Section
......................................................................

SYSTEM AND METHOD FOR A COMPUTER-BASED DYNAMIC INFORMATION CLIPPING SERVICE

BACKGROUND OF THE INVENTION

1. Field of the Invention

The field of the invention relates generally to accessing information on a network, and more particularly, to a system and method providing a dynamic information clipping service.

2. Related Art

Computer networks and on-line services, such as the Internet, have become a common source of news and information for computer end-users. The Internet's size and (lack of) organization, however, make repeated accesses to, and sorting of, data on a periodic basis very time consuming.

Programs have been developed that perform automatic searches for end-users to retrieve information based on specific search queries. These programs merely return search results as files for consumption (e.g., reading) by the end-user. The data returned by these programs is in its original format, which varies greatly from item to item (and from service-to-service). The various item/document formats complicates reading them.

Commercial databases, such as Lexis/Nexis™, Orbit™, Dialog™ and the like, are separate from the Internet and provide some form of item/document formatting when search results are displayed to the end-user. These services are very expensive. To reduce costs for repeat searches, some commercial databases provide other search services that automatically perform update searches periodically. In this case, the search query is saved by the service provider's system.

The same search is repeated at time intervals specified by the end-user, and the results are forwarded to the end-user automatically. However, if terms used to formulate a search query are not accurate, or the subject matter of the topic has developed new terminology or is otherwise divergent, the search query becomes stale. Thus, the results of the subsequent repeat searches can become inaccurate; decreasing both the precision of the search, and the recall of the information by utilizing such queries.

What is needed for Internet end-users is an accurate technique/service for accessing information on "the net" with a minimum level of user specificity and involvement, while being cost and time efficient.

SUMMARY OF THE INVENTION

The present invention is directed to a system and computer-based method providing a dynamic information clipping service. An end-user creates a template of topics of interest via a graphical user interface. The template is transmitted to a central site for processing. At the central site, data is collected that relates to a particular base of knowledge. The data is then parsed, indexed and stored in an information repository.

Processing of the template comprises parsing it, collecting command-strings relating to the parsed template, and querying the information repository using the collected command-strings to generate query results. The query results are then sorted. A HyperText Mark-up Language (HTML) page is created using the sorted query results. The HTML "page" is delivered or otherwise made available on a periodic basis to the end-user for viewing, wherein the HTML page represents a custom network-based newspaper.

A preferred embodiment of the invention is a system and method that provides a dynamic information clipping service for the Internet.

In a preferred embodiment of the invention, collecting data includes using an infobot responsive to Uniform Resource Locators (URLs) to traverse hyperlinks associated with a particular base of knowledge.

In a further embodiment, the collecting includes the creation, and maintenance of a master topics file. This includes creating and assigning keys to each entry in the template, comparing the keys to the master topics file. If a match is found, that command-string is retrieved from the master topics file used for querying (i.e., searching) of the information repository and then adding the results of the query to the end-user's page that corresponds to the template being processed.

Modification to the master topics file is done in a manner that is transparent to the end-user, so as to provide more accurate and current information to the end-user without requiring the end-user to modify the template.

BRIEF DESCRIPTION OF THE FIGURES

The present invention will be described with reference to the accompanying drawings, wherein.

The preferred embodiment of the invention is described below with reference to these figures where like reference numbers indicate identical or functionally similar elements. Also in the figures, the left most digit of each reference number corresponds to the figure in which the reference number is first used.

DETAILED DESCRIPTION OF THE PREFERRED EMBODIMENTS

The present invention provides a user-friendly method for constructing a "template" that dictates the type of information an end-user is interested in. The invention includes a series of back-end processes that collect, categorize, filter, search, retrieve, and assemble the desired information into a HyperText Mark-up Language (HTML) "page". The invention also includes a method for viewing such a "page" through a Web-browser, such as Netscape Communications Corporation's Netscape™ browser.

As used below, WWW stands for "World Wide Web." The WWW project, started by CERN (the European Laboratory for Particle Physics), seeks to build a distributed hypermedia system. The WWW, also referred to as the "Web," can be termed a client-server based, information presentation system in which everything is a (possibly) hypertext document that may be searchable.

URL is a draft standard for specifying an object on the Internet, such as a file or newsgroup. The following are URL formats (file: and ftp: URLs are synonymous):

file ://wuarchive.wustl.edu/mirrors/msdos/graphics/gifkit.zip
ftp://wuarchive.wustl.edu/mirrors http://www.w3.org:80/default.html
news:alt.hypertext
telnet://dra.com The first part of the URL, before the colon, specifies the access method. The part of the URL after the colon is interpreted specific to the access method. In general, two slashes after the colon indicate a machine name (machine:port is also valid). In general, documents on the WWW are written in HTML.

Figure 1:
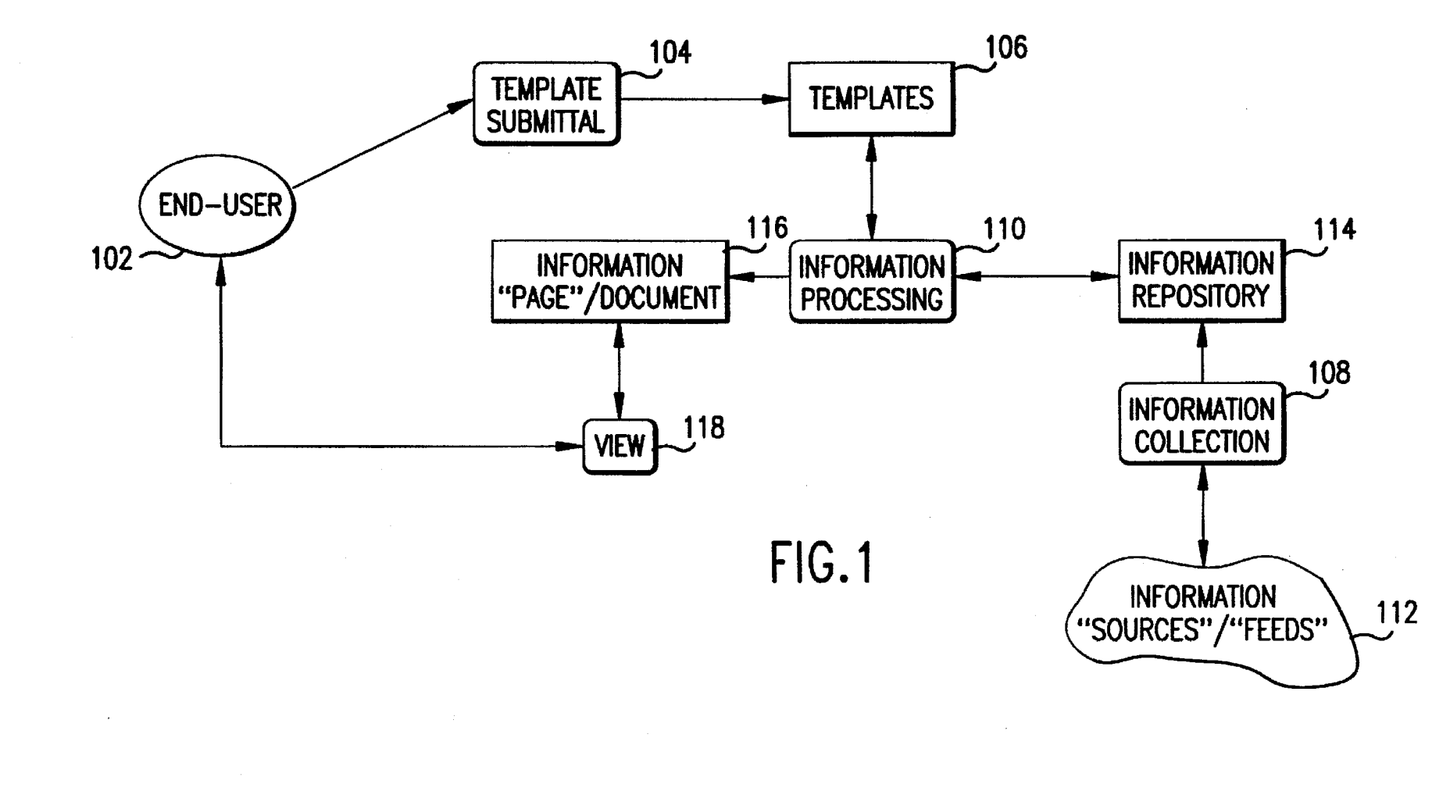
FIG. 1 shows a high-level view of the process according to the present invention.

An environment created according to the present invention can best be described as an Internet-based, dynamic, "information clipping service." FIG. 1 shows a high-level view of the process according to the present invention. (In the operational diagrams of the invention, rectangles with square corners represent dam stores, such a templates or pages. Rectangles with smoothed corners represent processes, such as template submittal or viewing processes.)

Template Submittal

Figure 2A:
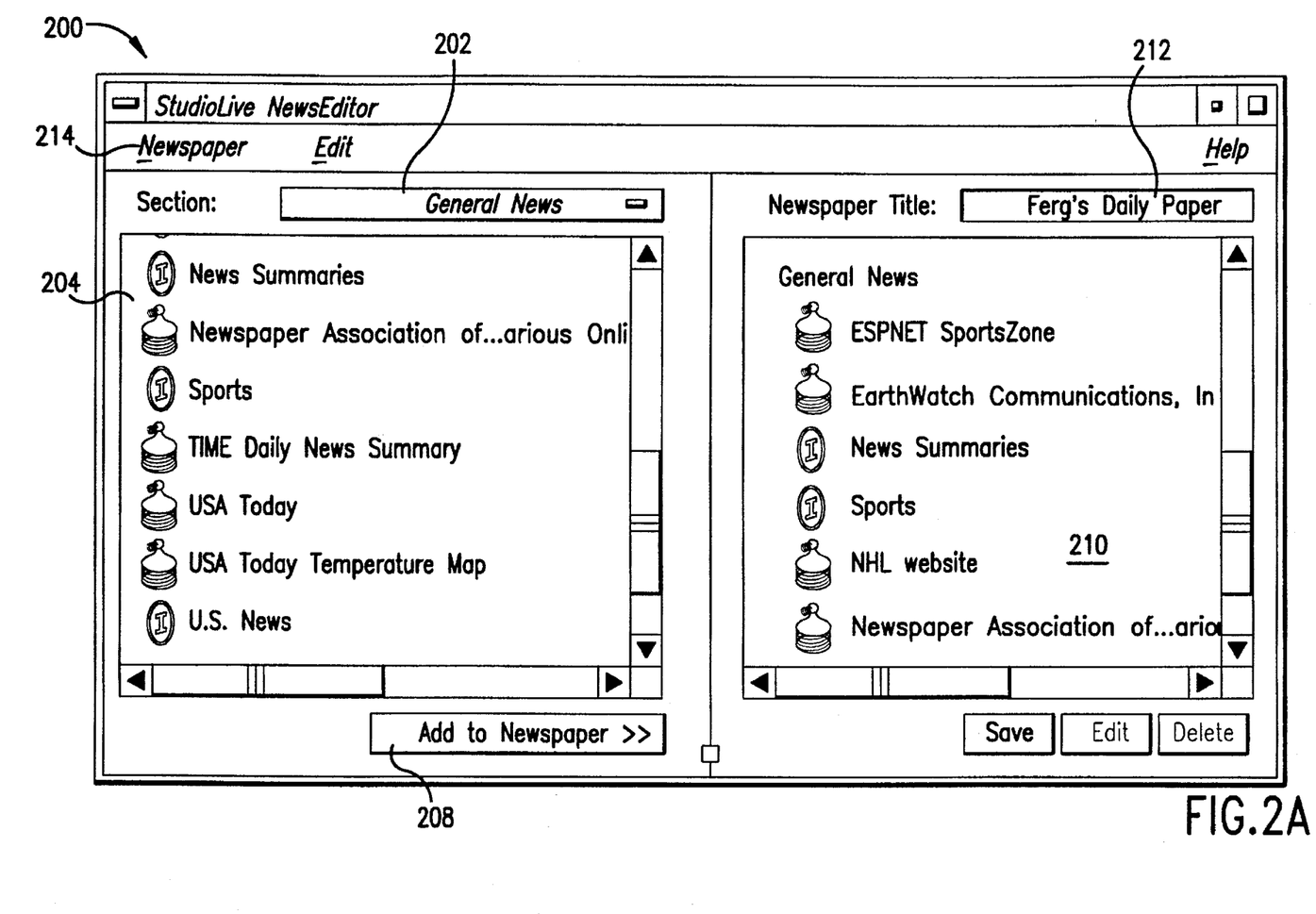
FIGS. 2A, 2B, 2C and 2D show various features of an exemplary NewsEditor application window 200, according to a preferred embodiment of the present invention.

The submittal process is very straight-forward: a graphical user interface (GUI; not shown) is run by an end-user 102 to choose topics of interest, broken down by section. Specific Web sites (addressed by their URLs/Uniform Resource Locators) can be used within the resultant template as well. The template, upon the end-user saving it at the end-user's site (see template submittal process 104), is then transmitted to a central site for processing. At the central site, the transmitted template is read and stored as a file in a templates store 106. In connection with the present invention the GUI is called a "NewsEditor." An exemplary NewsEditor GUI is shown in FIG. 2. The features of the NewsEditor GUI/template will be described in detail below.

Information Collection

Turning again to FIG. 1, information collection 108 and information processing 110 are important aspects of the system. Without the appropriate information, the resultant "page" will hardly be worth reading. The information collection process collects data in the form of "sources" and "feeds" 112. This aspect of the system currently comprises of two components: a "Web-crawler," also called an "infobot," combs (i.e., searches) selected areas of the Web and catalogs documents for eventual indexing; and a capability that allows for certain "newsfeeds" to enter the system and therefore possibly become a part of an end-user's page.

Exemplary newsfeeds include Associated Press Inc. (API) wire services and MultimediaWire™, which is transmitted to the control site via Internet email from Bethesda, Md. Both the infobot and the newsfeeds will be described in detail below.

Collected information is stored in an information repository 114. The information processing 108 correlates end-user templates in template store 106 with the information in the information repository 114 to create the end-user's page 116. The end-user implements a view process 118 to read the page.

The present invention permits templates of many end-users to be serviced by one or more central sites. The central site(s) process templates and collected information at different times, depending on end-user specified variables, and the rate at which information is updated in the information repository 114. Thus, the template submittal process 104, information collection process 110, information processing 108, and view process 118 can all run independently or in parallel with each other. For example, template submittal can be done at any time, even when information is being processed for the templates previously stored at a central site.

Figure 2B:
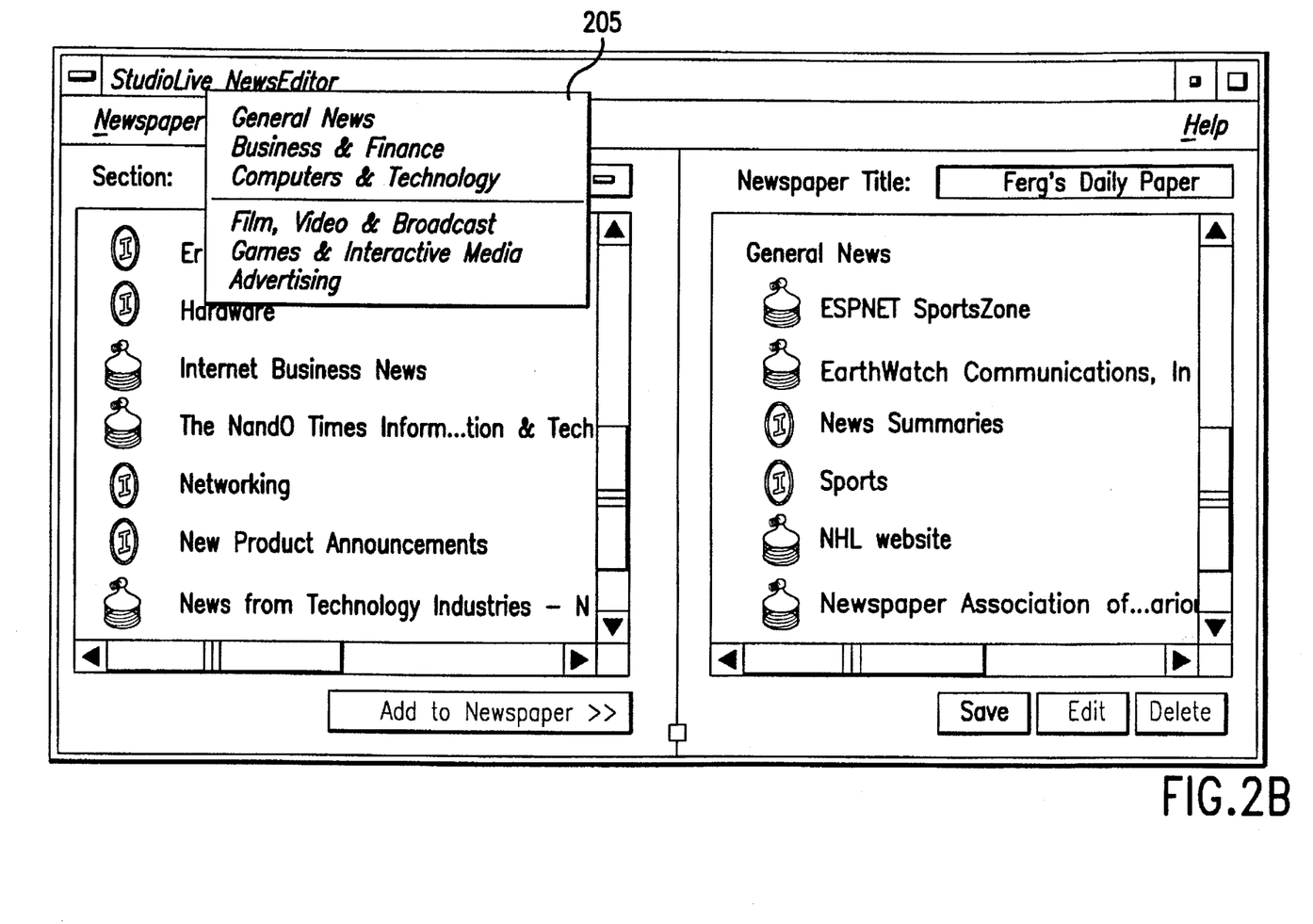

FIG. 2A shows an exemplary NewsEditor application window 200. Different sections that are available to the end-user to select are displayed at an options menu button 202 titled "Section." Listed on the options menu button 202 is the currently selected section. In the example, the currently selected section is titled "General News." (Other example sections include the following: Business & Finance; Computers & Technology; Film, Video & Broadcast; Games & Interactive Media; and Advertising.) A portion of the entries available under the section General News are displayed in a large window 204 (called the entries window) below the section heading. The options menu button expands into a list of available sections when clicked-on by the end-user, as shown at 205 of FIG. 2B. Once the section options menu is expanded, the user may click on another section to view its entries in window 204.

Figure 2C:
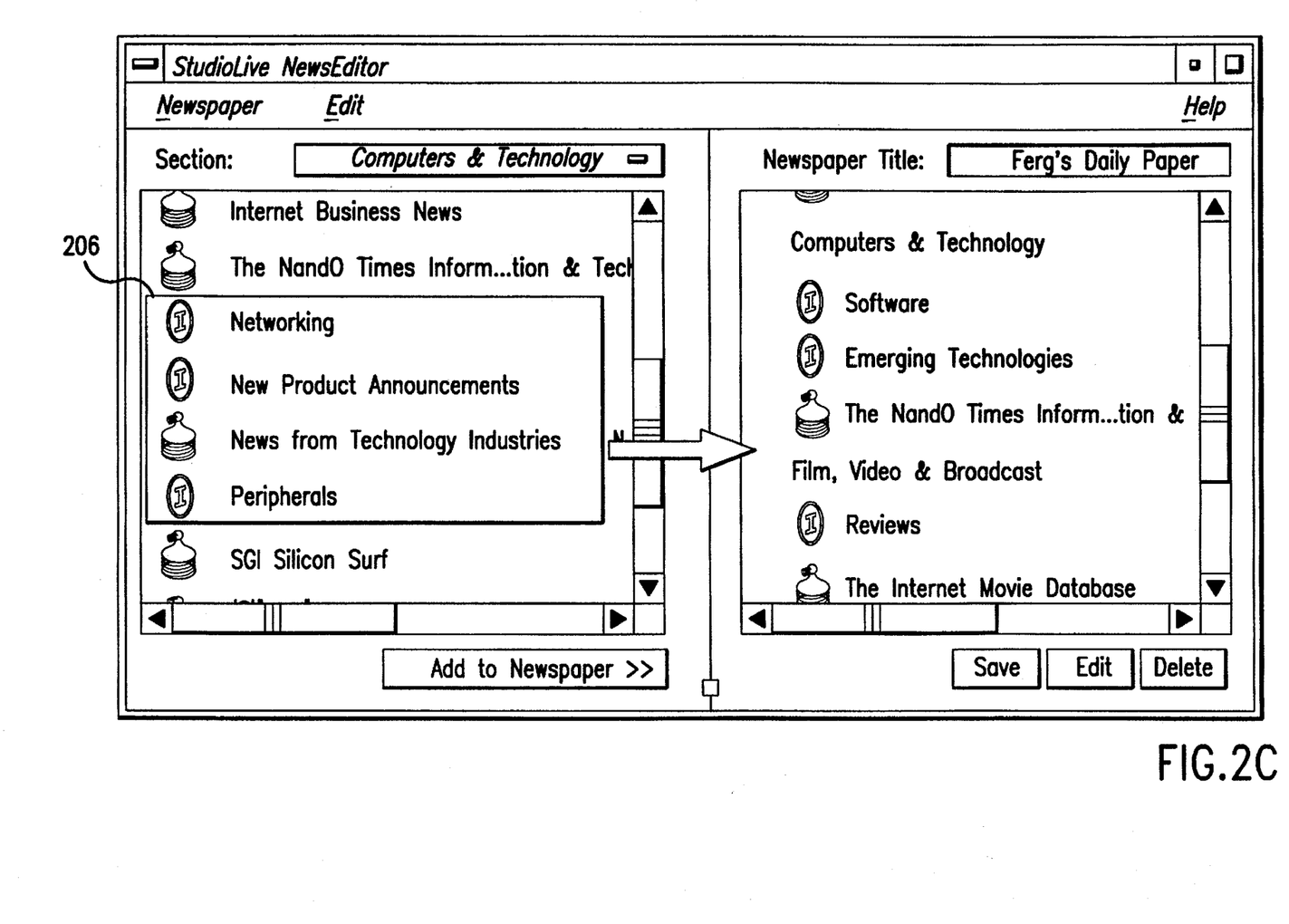

One or more entries can be selected by the end-user by clicking on the desired item, or by dragging a "rubberband" around a group of items to select them. As shown in FIG. 2C, once one or more items 206 in the entry window 204 are selected, the end-user simply clicks on the "Add to Newspaper" button 208 to add these items to his custom newspaper template. Other methods of selecting an entry by the end-user will become apparent to those skilled in the GUI art.

Once one or more entries are selected, the NewsEditor application then automatically adds the selected entries to the custom newspaper template and instantaneously displays the template as an outline at a second large window 210 (called the custom newspaper template window) located on the right side of the application window 200. Alternatively, the end-user drags the selected items 206 and drops them into the custom newspaper template window 210 using the pointer device (e.g., mouse or trackball; not shown), at which point they are added to the custom newspaper template.

Figure 2D:
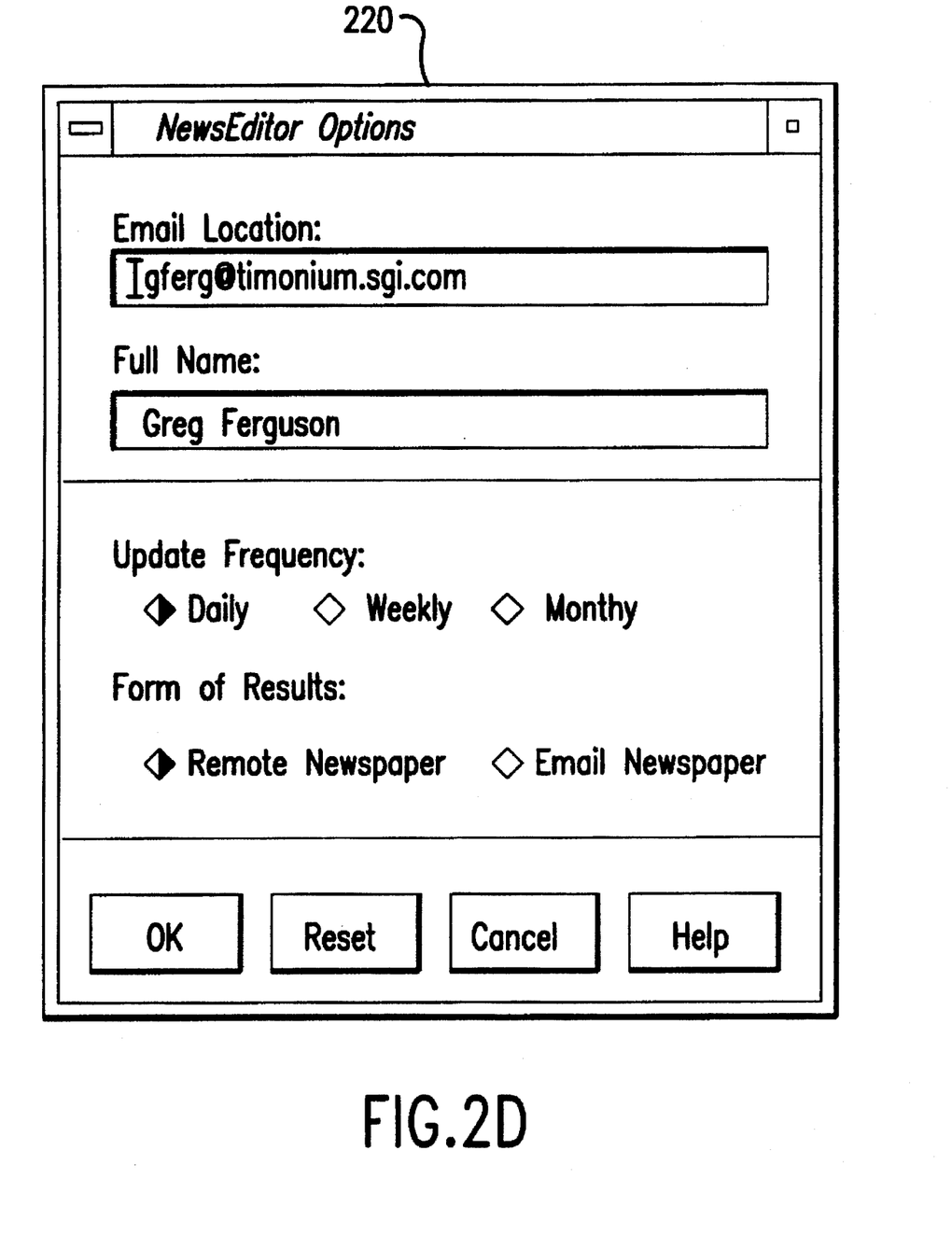

The end-user is permitted to name the custom newspaper template via a "Newspaper Title" edit box 212. Under the "Newspaper" menu item 214 is an "options" button that allow the end-user to set-up where the newspaper will be sent to and to specify the frequency of the updating of the paper (e.g., daily, weekly or monthly). A "NewEditor Options" menu 220 is shown in FIG. 2D. The operations performed by the "Save," "Edit" and "Delete" buttons, as well as other common functions not shown in the figures will be apparent to a person skilled in the art, and familiar with GUI-based application programs.

The 'T' icons represent topics-based entries, and the other icons represent "web-jumpers." Web-jumpers represent specific Internet Web sites (URLs) that can be accessed by adding them to the custom newspaper template. The I-icons perform a structured search using command strings to filter through the information repository, as will be discussed in detail below. Each web-jumper is a hyperlink to a preferred web site that the end-user frequently explores.

Figure 3:
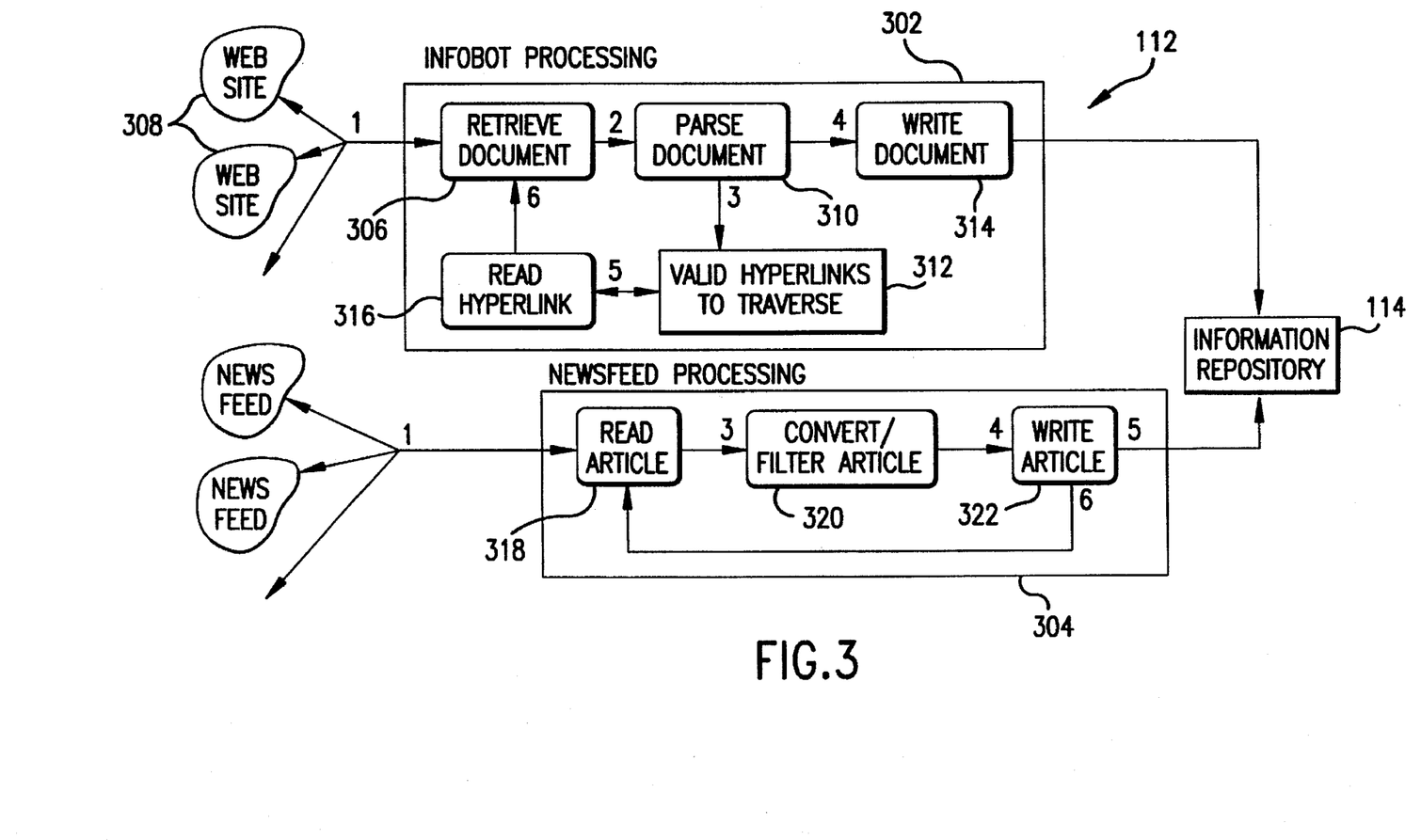
FIG. 3 shows more detail of the information collection process 112 of FIG. 1, according to a preferred embodiment of the present invention.

FIG. 3 shows more detail of the information collection process 112. Infobot processing is shown at 302 and newsfeed processing is shown at 304. The infobot accepts a specific URL (or Web-site identifier) and traverses down through all hyperlinks associated therewith. The initial page, called a "homepage," is retrieved from a web site 308. The homepage is parsed at 310 by examining each hyperlink in the homepage to determine if it should be traversed, as shown at step 312. Various checks are performed on each hyperlink to determine if the document pointed to by the hyperlink is "desirable." If so, the hyperlink is written to a stack and the process repeats for all hyperlinks. The resultant document that was retrieved (at a step 306 from the web site 308) is then written to the information repository 114 for later indexing, as shown at a process step 314. The next hyperlink is then popped off the stack and read, as shown at a process step 316. The corresponding document is retrieved (at step 306) and the process of evaluating the hyperlinks repeats, until the stack is cleared. The infobot validates hyperlinks by not traversing any one hyperlink more than once (preventing it from getting caught in a circular "loop").

The newsfeed processing 304 receives/reads (see process step 318) incoming documents, which are in the form of e-mail or direct satellite feeds to the central site, and automatically parses and filters the documents into individual articles, as shown at step 320. Again, these articles are then written to the information repository (see step 322) where they are indexed, making them available for possible inclusion in an end-user's page. The conversion/filter step 320 comprises translating the document/article from its source format into HTML.

Information Processing

Figure 4:
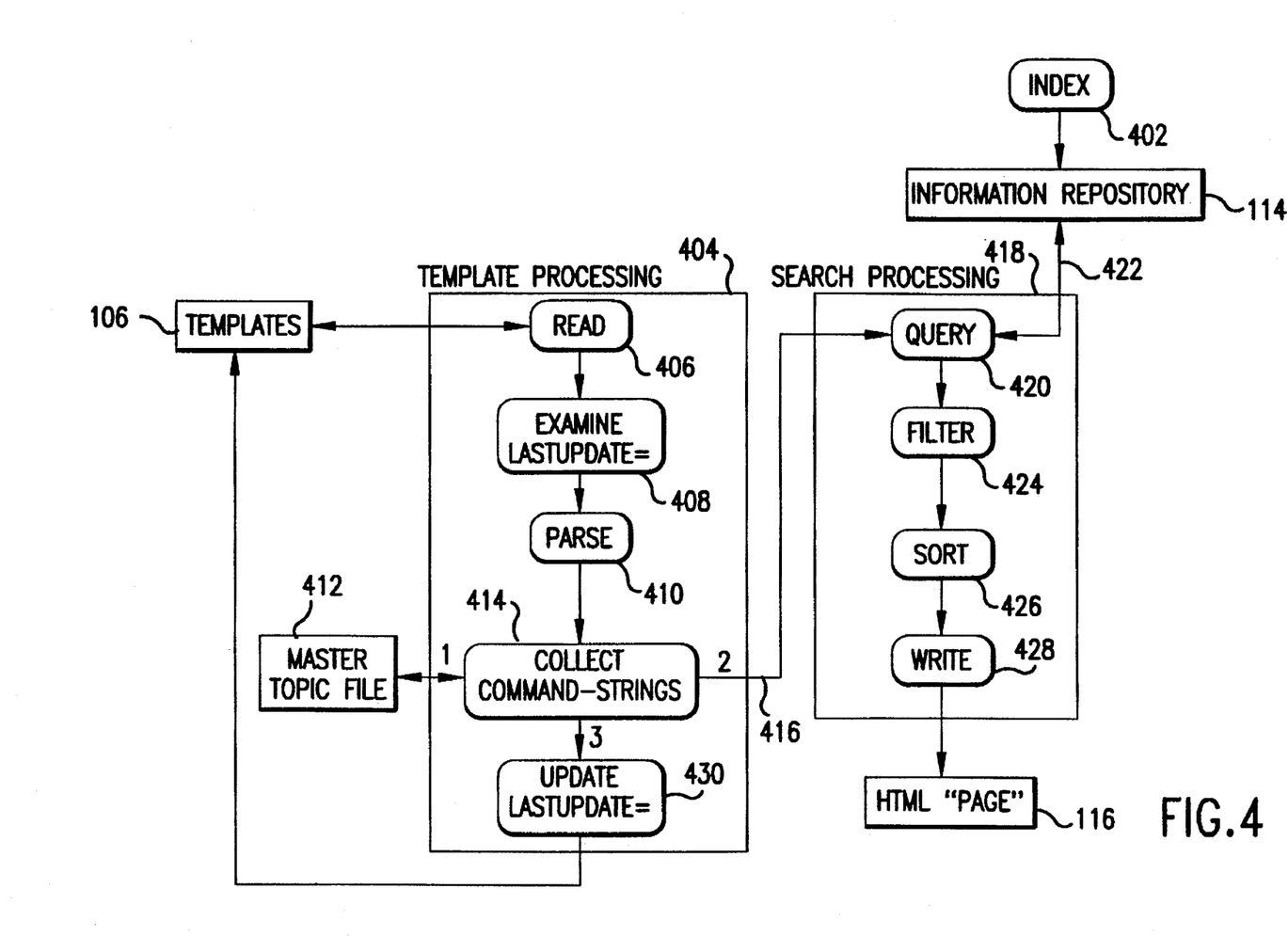
FIG. 4 shows more detail of information processing phase 112 of FIG. 1, according to a preferred embodiment of the present invention.

Information processing 108 will now be described in more detail with reference to FIG. 4. The first step is to ensure that all documents found in the information repository 114 are properly indexed for retrieval. Indexing of the information in the information repository is shown generally at processing step 402. A third party software package is used to perform this operation (available from Fulcrum Technologies, Inc., Ottawa, Ontario, Canada). This package indexes all relevant words found within each document, and provides a method for reading the indices. After indexing, information is available for possible inclusion in an end-user's page.

The first step in preparing the end-user's "page" is to examine the template file that was submitted. This evaluation is called template processing, and is shown generally at 404. Each template file is read (at a process step 406), and a "lastupdate=" field of the file is queried and compared to the current date, at a process step 408. If the "page" requires updating (based on the end-user's Update Preference; e.g., daily, weekly, or monthly), the file is parsed, at a process step 410.

In parsing a template file, each entry in the file contains a certain "key" value. This key value corresponds to a particular topic-based entry. The key value may correspond to what is contained in a master topic file 412. If the key is found, a processing "command string" is retrieved from master file 412, as shown at a processing step 414. A command string is a collection of query parameters, such as: phrases; information regarding which sources to access for a particular topic; and additionally, the limit on the number of documents that will occur in the resultant set; the sort criteria; and other search related parameters that will be apparent to one skilled in the art of information retrieval. The master topics file is maintained (i.e., created, organized and updated) and resides only on the central machine, allowing easy modification and refinement without end-user intervention. The resultant "command string" can be appended-to by the end-user through the use of the GUI (NewsEditor), although by design, they have no specific knowledge of what is contained in the "command string." Only topic-based entries, not URLs, require interrogation of the master topics file.

Once the command string is retrieved, it is passed (see arrow 416) to the search processing stage, shown generally at 418. The information repository 114 is queried (i.e., searched), as shown at processing step 420. Documents that satisfy the query are returned in a result set, as represented by arrow 422. That result set is filtered (see process step 424) according to what would be deemed of the highest relevance to the query, and the set is then sorted (see process step 426) by date, putting pointers to the most current documents at the top of the result set. Those pointers are manipulated in such a way so that they provide addresses (URLs) to Web-based (Internet) documents. These addresses are also referred to as HTTP (or HyperText-Transfer Protocol) addresses. In specifying an address, URLs are used within the "page" to actually point to the original document that was retrieved during the information collection 112. This permits the system not to have to maintain copies of the documents from the selected Web sites that the infobot processes. Newsfeed documents are stored within the central (Web) site, since these are not Web-based documents currently found on other Web sites, and hence must be maintained locally.

After processing all entries within a template file, the resultant "page" is written out (see process step 428), and is now ready for access (viewing) by the end-user. Finally, the "lastupdate=" field of the template is updated to reflect the current date, as shown at a processing step 430.

Viewing

Figure 5:
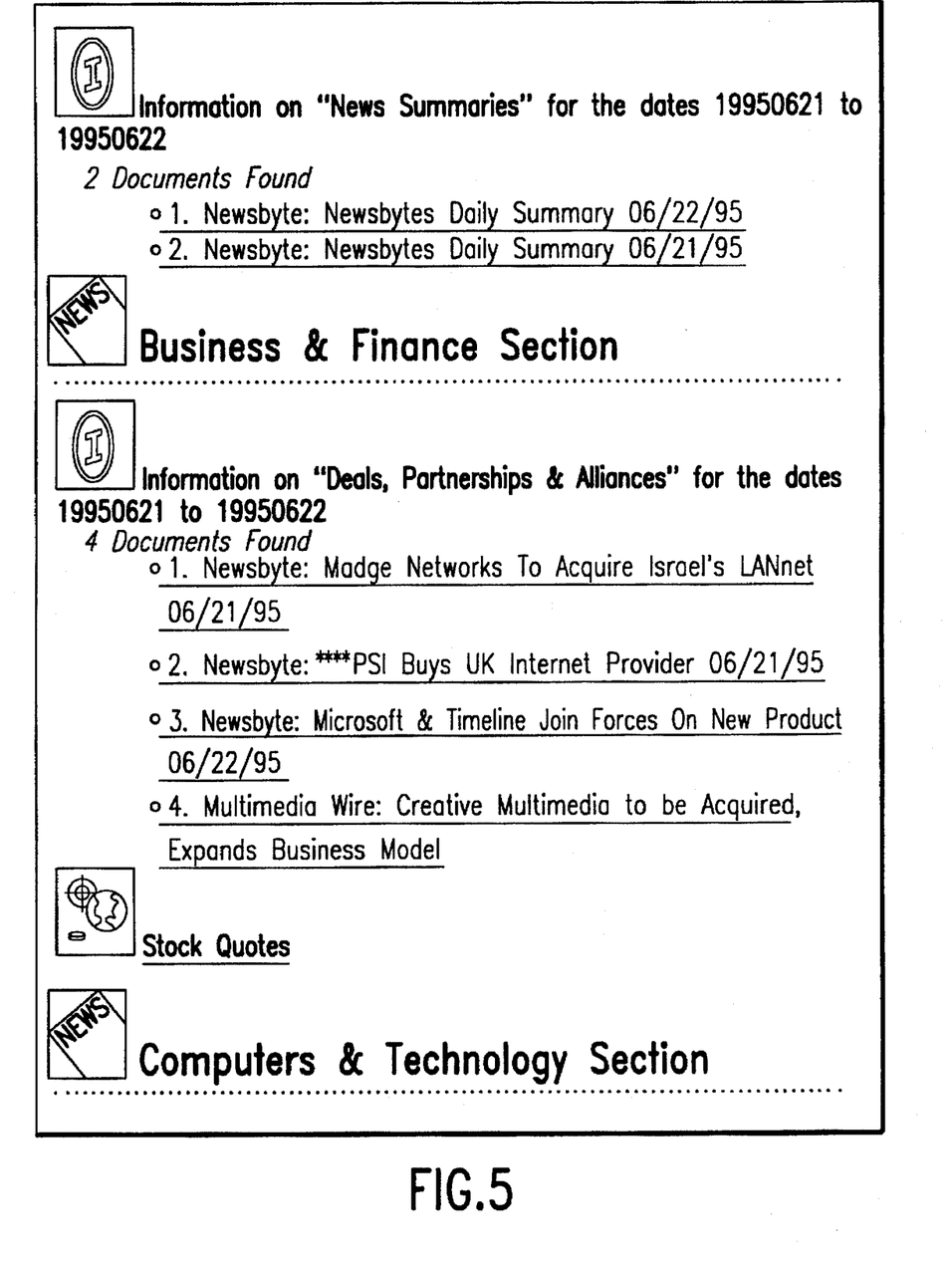
FIG. 5 shows a resultant "page," according to a preferred embodiment of the present invention.

Viewing the resultant Web-based "page" is done through any Web Browser, such as Netscape Communications Corporation's (Mountain View, Calif. Netscape™ browser. Clicking on a document title (part of the result set for a given topic in the template file) will cause the browser to display the full article. An example (portion) of a resultant "page" is shown in FIG. 5.

Hardware

Figure 6:
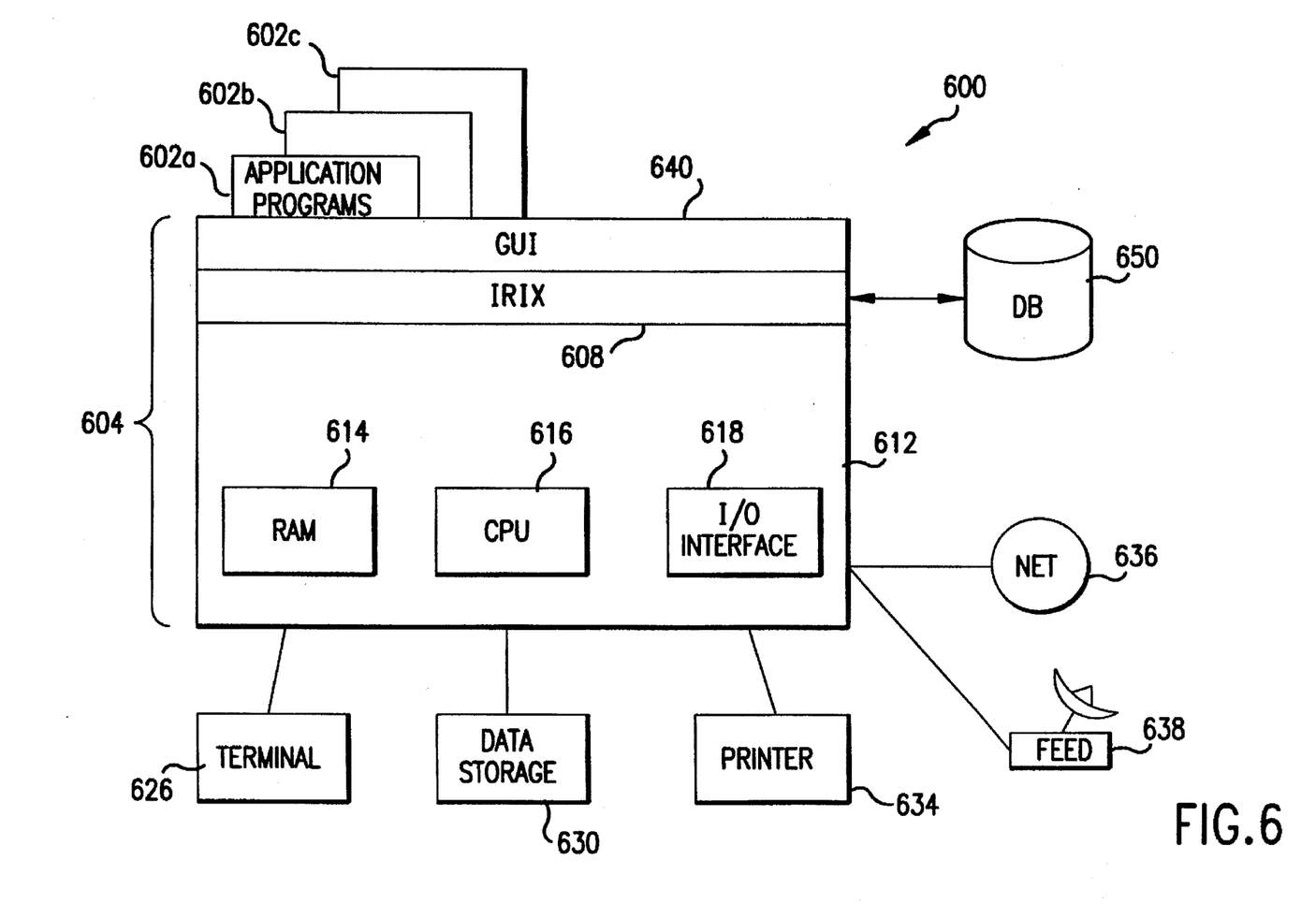
FIG. 6 shows a general hardware environment in which a preferred embodiment of the present invention can operate.

FIG. 6 illustrates a general hardware environment in which a preferred embodiment of the present invention can operate. The environment 600 of the present invention includes application programs 602a, 602b and 602c. Computer platform 604 includes a hardware unit 612, which includes potentially multiple central processing units (CPUs) 616, a random access memory (RAM) 614, and an input/output interface 618. Computer platform 604 includes an operating system 608. Various peripheral components may be connected to computer platform 604, such as a graphics terminal 626, a data storage device 630, a printing device 634, network 636, and newsfeed 638.

Computer platform 604 is any personal computer, workstation or mainframe computer. In a preferred embodiment, CPU 616 is any processor from the MIPS family of processors including R3000 et. seq. Operating System 608 can be any operating system compatible with computer platform 604. In a preferred embodiment, operation system 608 is the IRIX operating system version 5.3 or greater available from Silicon Graphics. IRIX supports an X System-Windows based graphical user interface (GUI) 640. Operating system 608 must provide a mechanism for multitasking. Operating system 608 is further connected to access a database 650 or other storage media.

The central site and end-user site each comprise hardware such as a environment 600. The end-user site and the central site can be located on the same or separate networks, and thus can be located a great distance apart (i.e., both sites can be independent computer systems having a common network or each can have access to the Internet). In a preferred embodiment, database 650 is configured to store the information repository at the central site. The Newseditor/ template can comprise an application program at the end-user's site, and the information collection and information processing is implemented as an application program at the central site. Accordingly, only the central site need have the newsfeed via cable, satellite, or the like.

In one embodiment, the present invention is a computer program product (such as a floppy disk, compact disk, etc. also referred to as a computer usable medium) comprising a computer readable media having control logic recorded thereon. The control logic, when loaded into memory 614 and executed by the CPU 616, enables the CPU 616 to perform the operations described herein. Accordingly, such control logic represents a controller, since it controls the CPU 616 during execution.

Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents. All cited patent documents and publications in the above description are incorporated herein by reference.

What is claimed is:

1. A computer-based method providing a dynamic information clipping service, comprising the steps of:
   at an end-user site,
   (1) permitting an end-user to create a template of topics of interest via a graphical user interface; and
   (2) transmitting said template to a central site for processing; at said central site,
      (1) collecting information relating to a particular base of knowledge using an infobot responsive to Uniform Resource Locators to traverse hyperlinks associated with said base of knowledge;
      (2) parsing and indexing said information;
      (3) storing said parsed and indexed information in an information repository;
      (4) processing said template, wherein said processing includes
         (a) parsing said template,
         (b) collecting command-strings relating to said topics of interest found within said parsed template,
         (c) querying said information repository using said collected command-strings to generate query results,
         (d) sorting said query results, and
         (e) creating a Hypertext Mark-up Language (HTML) page using said sorted query results; and
      (5) making said page available to the end-user for viewing, wherein said page represents a custom network-based newspaper.

2. The method of claim 1, wherein said topics of interest relate to information obtained from at least one of web sites and newsfeeds.

3. The method of claim 1, wherein said step of making comprises the step of delivering, automatically and periodically according to a period set by the end-user, said HTML page to the end-user for viewing.

4. The method of claim 1, wherein said step of collecting comprises maintaining information master topics file, and said method further comprises the steps of:

assigning keys to each entry in said template;
comparing said keys to said master topics file; and
if a match is found, retrieving one of said command-strings from the master topics file.

5. The method of claim 4, further comprising a step of modifying said master topics file in a manner transparent to the end-user, so as to provide more accurate and current information the end-user without requiring the end-user to modify said template.

6. A computer program product for use with a dynamic information clipping service operating on a computer system, said computer program product comprising:
   a first computer usable medium having computer readable program code means embodied in said medium for causing an application program to run at an end-user site, said computer readable program code means comprising
   (1) a computer readable first program code means for causing the computer system to permit an end-user to create a template of topics of interest relating to information obtained from at least one of web sites and newsfeeds via a graphical user interface; and
   (2) a computer readable second program code means for causing the computer system to transmit said template to a central site for processing.

7. The computer program product of claim 6, further comprising:
   a second computer usable medium having second computer readable program code means embodied in said medium for causing an second application program to run at a central site, said second computer readable program code means comprising:
   (1) a computer readable third program code means for causing the computer system to collect information relating to a particular base of knowledge;
   (2) a computer readable fourth program code means for causing the computer system to parse and indexing said collected information;
   (3) a computer readable fifth program code means for causing the computer system to store said parsed and indexed information in an information repository;
   (4) a computer readable sixth program code means for causing the computer system to process said template, wherein said processing includes
      (a) a computer readable seventh program code means for causing the computer system to parse said template,
      (b) a computer readable eighth program code means for causing the computer system to collect command-strings relating to said parsed template,
      (c) a computer readable ninth program code means for causing the computer system to query said information repository using said collected command-strings to generate query results,
      (d) a computer readable tenth program code means for causing the computer system to sort said query results, and
      (e) a computer readable eleventh program code means for
   causing the computer system to create a page using said sorted query results; and
   (5) a computer readable twelfth program code means for causing the computer system to make said page available to the end-user for viewing, wherein said page represents a custom network-based newspaper.

8. A computer program product of claim 7, wherein said page is produced in Hypertext Mark-up Language (HTML) format.

9. A computer program product for use with a dynamic information clipping service operating on a computer system, said computer program product comprising:

a first computer usable medium having computer readable program code means embodied in said medium for causing a first application program to run at a central site, said first computer readable program code means comprising (1) a computer readable first program code means for causing the computer system to collect information relating to a particular base of knowledge;

(2) a computer readable second program code means for causing the computer system to parse and indexing said collected information;

(3) a computer readable third program code means for causing the computer system to store said parsed and indexed information in an information repository;

(4) a computer readable fourth program code means for causing the computer system to process a template of topics of interest relating to information obtained from at least one web sites and newsfeeds, wherein said processing includes (a) a computer readable fifth program code means for causing the computer system to parse said template, (b) a computer readable sixth program code means for causing the computer system to collect command-strings relating to said parsed template from a master topics file, (c) a computer readable seventh program code means for causing the computer system to query said information repository using said collected command-strings to generate query results, (d) a computer readable eighth program code means for causing the computer system to sort said query results, and (e) a computer readable ninth program code means for causing the computer system to create a page using said sorted query results; and (5) a computer readable tenth program code means for causing the computer system to make said page available to the end-user for viewing, wherein said page represents a custom network-based newspaper.

10. The computer program product of claim 9, wherein said page is produced in Hypertext Mark-up Language (HTML) format.

11. A computer system for providing a dynamic information clipping service, comprising:

end-user site means comprising (1) first means for permitting an end-user to create a template of topics of interest relating to information obtained from at least one of web sites and newsfeeds via a graphical user interface, and (2) second means for transmitting said template to a central site for processing; and a central site means comprising (1) third means for collecting information relating to a particular base of knowledge (2) fourth means for parsing and indexing said collected information (3) fifth means for storing said parsed and indexed information in an information repository (4) sixth means for processing said template, wherein said sixth means includes (a) seventh means for parsing said template, (b) eighth means for- collecting command-strings relating to said parsed template, (c) ninth means for querying said information repository using said collected command-strings to generate query results, (d) tenth means for sorting said query results, and (e) eleventh means for creating a page using said sorted query results and (5) twelfth means for making said page available to the end-user for viewing, wherein said page represents a custom network-based newspaper.

12. The computer system of claim 11, wherein said page is in Hypertext Mark-up Language (HTML) format.

13. The computer system of claim 11, wherein said third means comprises using an infobot responsive to Uniform Resource Locators to traverse hyperlinks associated with said base of knowledge.

14. The computer system of claim 11, wherein said end-user site means and said central site means are independent.

* * * * *